US012307866B2

(12) United States Patent
Brühwiler

(10) Patent No.: US 12,307,866 B2
(45) Date of Patent: May 20, 2025

(54) SECURITY BAG

(71) Applicant: Pataco AG, Henau (CH)

(72) Inventor: Cornel Brühwiler, Gossau (CH)

(73) Assignee: PATACO AG, Henau (CH)

( * ) Notice: Subject to any disclaimer, the term of this patent is extended or adjusted under 35 U.S.C. 154(b) by 0 days.

(21) Appl. No.: 18/029,735

(22) PCT Filed: Oct. 22, 2020

(86) PCT No.: PCT/EP2020/079806
§ 371 (c)(1),
(2) Date: Mar. 31, 2023

(87) PCT Pub. No.: WO2022/083872
PCT Pub. Date: Apr. 28, 2022

(65) Prior Publication Data
US 2023/0386312 A1 Nov. 30, 2023

(51) Int. Cl.
*G08B 13/24* (2006.01)

(52) U.S. Cl.
CPC ................................ *G08B 13/2434* (2013.01)

(58) Field of Classification Search
CPC ............ G08B 13/2434; G08B 13/2448; G08B 13/126
See application file for complete search history.

(56) References Cited

U.S. PATENT DOCUMENTS 3,594,770 A * 7/1971 Ham .................... G08B 13/126 174/105 R
4,578,670 A * 3/1986 Joergensen .......... G08B 13/126 340/550
4,799,435 A * 1/1989 Boutroy ................. G07D 11/12 109/42
4,999,608 A * 3/1991 Galomb ............... G08B 13/126 340/550
5,568,124 A * 10/1996 Joyce ................... G08B 13/126 109/42
5,677,674 A * 10/1997 Wolf ....................... B60R 25/00 340/564
6,400,268 B1 * 6/2002 Lindskog ................ E05G 1/024 340/552

(Continued)

FOREIGN PATENT DOCUMENTS

EP 2577631 B1 3/2015
GB 2462725 A 2/2010

OTHER PUBLICATIONS

International Search Report issued in PCT Application No. PCT/EP2020/079806, dated Jul. 8, 2021.

*Primary Examiner* — Nay Tun
(74) *Attorney, Agent, or Firm* — Dilworth IP, LLC

(57) ABSTRACT

A security bag including a bag wall and a conductor track which is embedded in the bag wall or arranged on the bag wall. The security bag includes a connection interface, which is configured to interlock the security bag to a security tag. The security bag includes electrical contacts formed integrally with the conductor track. The electrical contacts are configured to electrically connect the conductor track. A path of the conductor track defines a plurality of surface segments on the bag surface. Each surface segment is delimited along any direction on the bag surface by the conductor track.

14 Claims, 5 Drawing Sheets

(56) References Cited

U.S. PATENT DOCUMENTS

| | | | | |
|---|---|---|---|---|
| 6,995,353 | B2 * | 2/2006 | Beinhocker | G01J 1/42 385/12 |
| 7,256,692 | B2 * | 8/2007 | Vatsaas | G08B 13/126 307/147 |
| 7,352,284 | B2 * | 4/2008 | Krill | G08B 13/1445 340/541 |
| 7,436,313 | B2 * | 10/2008 | Bassilious | E05G 1/024 340/568.1 |
| 7,758,911 | B2 * | 7/2010 | Heffner | G06F 21/87 427/58 |
| 8,971,673 | B2 * | 3/2015 | Beinhocker | G08B 13/12 340/541 |
| 9,524,626 | B2 | 12/2016 | Brühwiler et al. | |
| 2001/0022552 | A1 | 9/2001 | Maloney | |
| 2008/0024300 | A1 | 1/2008 | Fawcett et al. | |
| 2012/0133507 | A1 * | 5/2012 | Bangera | D03D 15/00 340/540 |
| 2012/0187003 | A1 | 7/2012 | Stewart et al. | |

* cited by examiner

Fig. 5
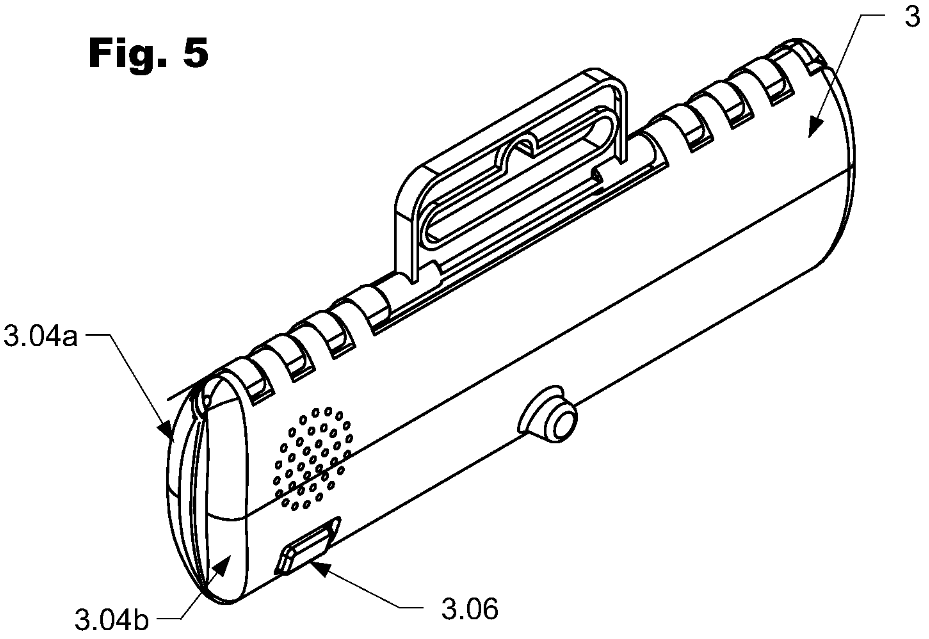
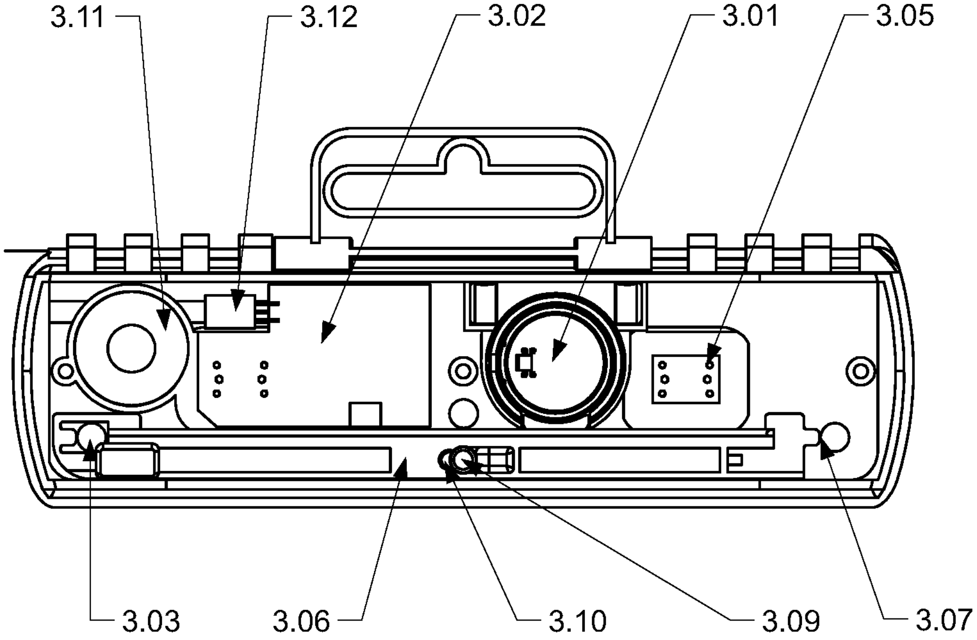
Fig. 6

SECURITY BAG

TECHNICAL FIELD

The present invention is in the field of retail security and in particular article surveillance to prevent theft or unauthorized removal of the object.

The invention relates to a security bag for attachment to a security tag, a security device including a security bag and a security tag. The invention further concerns a combination of a security bag and an object stored therein as well as a method for storing an object.

BACKGROUND

In the field of retail security and in particular article surveillance, mainly devices are known that are designed to be directly attached to a product. Those devices may be security marks that are attached to an item, or may be tags that are for example attached to clothing.

GB2462725A1 discloses an enclosure having a wall formed of flexible sheet material which incorporates an electrically conductive layer and further incorporates electronic means for monitoring the structural integrity of the electrically conductive layer and detecting any breach thereof. A secure closure may include electrically conductive elements forming electrical pathways which are monitored by the electronic means to detect if the integrity of the pathways is breached. The flexible sheet material may include a base layer and a flexible substrate provided with a flexible electrical track on an inner surface of the base layer.

EP2577631B1 discloses a securing device for attachment of an object which is to be secured. The securing device has a housing with a base plate and a lid as well as an apparatus for generating an alarm when the securing device is removed from the object without authorization. The apparatus for generating an alarm comprises a mechanical sensor and/or an optical sensor. In the closed state, the mechanical sensor can detect contact with the object by the base plate and can react to a loss of contact with the object.

Further known is the AW03-spider web alarm, a security device made by Alien Security for securing piece goods. The security device is made of a mesh of conductive wires, that can be sealed with a mechanical element, that also houses the alarming device.

SUMMARY OF THE INVENTION

A major drawback of the security bag, shown in GB2462725A1, can be seen in the complex layer structure of the know security bag, consisting of up to 6 different layers, as well as the insufficient protection along the edges.

The security device shown in EP2577631B1 is not suitable for being used in combination with a flexible object like a security bag.

For the AW03 spider-web, the mesh is only suitable for goods of a certain minimum size, as smaller goods will fall out of it between the meshes. Furthermore, it is not suitable for food items and comparatively difficult to handle when filling or clearing. Also, the ability to present products in an aesthetically pleasing way is limited.

It is an overall objective to improve the state of the art regarding the storing and securing of objects stored in a security bag. Favorably, one or more of the before-mentioned drawbacks of the prior art are reduced or even limited. Special advantages and favorable characteristics of particular embodiments are further discussed in their respective context. In a general manner, the overall objective is achieved by the subject of the independent claims. Exemplary and particular embodiments are further defined by the subject of the dependent claims as well as the overall disclosure.

In an aspect, the overall objective is achieved by a security bag. In a further aspect, the overall objective is achieved by a method for storing an object in a security bag. The method includes the use of a security bag and/or a security device according to any embodiment of the present disclosure.

A security bag in accordance with the present disclosure includes a bag wall and a conductor track which is embedded in the bag wall or arranged on the bag wall. The security bag includes a connection interface, which is configured to interlock the security bag to a security tag. The security bag further includes electrical contacts which are formed integrally with the conductor track or are electrically connected to the conductor track. The electrical contacts are configured to electrically connect the conductor track. A path of the conductor track defines a plurality of surface segments on the bag surface. The surface segment is delimited in every direction on the bag surface by the conductor track. In this context, the expression “direction” is to be understood as linear direction, i. e. direction along a generally straight and non-curved line. Generally, the security bag includes two electrical contacts, wherein the conductor track extends between and electrically connects the two electrical contacts.

The minimal dimensions of an object that may be stored within the security bag in a theft-protected manner are generally given by the smallest possible projection or extension of the given object. For example, the minimal projection of a drill bit is not the extension in its main extension direction (the length of the shaft), but rather the diameter of the shaft. For safe theft-protection, the surface segments of a suitable bag need in principle to be dimensioned such that no hole can be cut into a surface segment through which the shaft of the drill bit would fit through, as a hole in the bag wall of the size of the shaft diameter would be already sufficient to remove the drill from the bag. From a practical point of view, however, the requirement regarding the surface segments may be somewhat less strict since it may be sufficient to make a theft, respectively an unauthorized and unobserved removal from the security bag sufficiently difficult even if not absolutely impossible, e. g. in a shop or warehouse.

The same applies to the other possible objects as well, in particular objects that are more flexible. E.g. for storing a piece of meat, the segment size is ideally chosen such that no hole can be cut in which would be small enough to remove the piece of meat in its most compressed state and in any orientation. In the context of storing food items, such as meat, minimum object dimensions may, for example, be in a range of several centimeters, whereas for storing a drill bit the minimum object dimension may be in the range of only several millimeters.

The bag wall is a quasi-two dimensional part. It has dimensions in two directions (lateral dimensions) that are substantially larger than the dimension in the third direction, which defines the thickness. The conductor track can be made of a metal film, e.g., aluminum or copper, or can be made from conductive ink. The conductor track may, e. g. be applied onto the bag wall. Suited methods for applying a conductor track onto flexible polymer layers are already known form the state of the art, for example in the production of RFID labels.

In an embodiment, the conductor track is manufactured from a metal sheet or foil, for example a copper foil, by way of etching as generally known in the art. Methods for applying the conductor track can be gluing, welding, pressing, stamping or printing. In some embodiments, the conductor track is applied by stamping or printing a conductive ink or a conductive dispersion, for example, metal nanoparticles that are dissolved in ethanol.

The thickness of the flexible polymer layer is favorably in the range from some hundredths of a millimeter up to some tenths of a millimeter. The thickness is favorably chosen such that the bag tears very easily upon manipulation. With other words, once a small opening is inserted into the bag wall, the bag wall will start tearing when trying to extract the stored object.

In some variants, the conductor track can be designed as a wire that is embedded in the wall. As an example, the wire can be designed as conductive nano-filaments, or made by printing the conductor track with conductive ink. Similar to conductive ink, nano-filaments can be at least semi-transparent. The advantage is that a thief cannot easily spot the path of the conductor track in or on the bag. Further, an invisible or substantially invisible conductor track may be preferable from an esthetic point of view.

In an embodiment, the connection interface of the security bag can be designed as a number of holes in the bag wall and the security tag can include a number of thereto corresponding pins that are configured to engage with the holes. In an engaging configuration, the pins interlock the security bag to the security tag in a form-locking manner. In further variants, the security tag can additionally or alternatively include a clamping element and the clamping element interlocks the security bag to the security tag in a force-locking manner.

In an embodiment, the electrical contacts are formed integrally with the conductor track. In an alternative variant, the electrical contacts can be also separate parts that are electrically connected with the conductor track.

In an embodiment, the surface segments of the security bag are rhomb shaped. Nevertheless, also other geometries for the surface segments are possible. The surface segments could, for example, also be rounded, rectangular, or asymmetrical. The conductor track can also meander on the bag wall without a symmetrical path or pattern. Further, the conductor track can also run in form of serpentines/wavy lines. These serpentines can be parallel or perpendicular to the at least one edge of the security bag. Starting from any point on the bag surface, when drawing a line on the bag surface in a random direction, one will always encounter a segment of the conductor track.

Favourably, the security bag can be applied to a multitude of objects such as expensive food items, like meat or seafood, small consumer electronic products or expensive but small tool accessories such as carbide drills or drill bits, thereby reducing and ideally eliminating the risk of the object to be stolen or generally removed without authorization. Favourably, the security bag does not require costly and/or complex mechanical arrangements, and nevertheless guarantees adequate protection. Favourably, the security bag is durable and is usable multiple times. In the context of food items, the security bag as well as a security tag as described further below are favorably suited to be also used in a low temperature environment like a fridge or a freezer. The security bag and security tag may be designed to be also used in low temperature environment, for example a temperature range from minus 30 degrees, or minus 18 degrees, minus 10 degrees or 7 degrees Celsius. For other applications the bag is designed to withstand humidity and/or higher temperatures when being used in other geographical regions like Asia, Africa or the Middle East. Therefore, the bag may be designed to withstand temperatures up to 50 degrees Celsius.

Favorably, the security bag and in particular the conductor track are designed in a manner that does not significantly disturb the visual appearance and enables an attractive presentation of the object placed inside the security bag. Therefore, the bag wall is favorably transparent. Further, the lateral width of the conductor track (corresponding to the wire diameter in case of the conductor track being a wire) should generally be small, e. g. in a range of less fractions of one millimeter up to some millimeters. The lateral width of the conductor track may, for example be in a range of 0.1 to 2 mm, such as 1 mm.

In an embodiment, the bag wall is made as a sandwich structure including a first and a second flexible polymer layer. In this embodiment, the conductor track is favorably at least partly sandwiched between the first and second flexible polymer layer. The bag wall of the security bag can be made as a sandwich structure including a first and a second flexible polymer layer.

The layers are typically connected respectively attached to each other, for example by way of welding over their full surface area. In a variant, the bag wall can be made of more than two layers, thereby improving the wear-resistance. This is advantageous as the security bags are favourably designed for a multiple usage. In an embodiment, the conductive track is at least partly sandwiched between the flexible polymer layers, in particular between the first and second flexible polymer layer as mentioned before. The conductive track can be applied on the first layer before the second layer is attached to the first layer, thereby covering the conductor track all over. In another embodiment, the conductive track can also only be inserted between the first and second layer. In an embodiment where the contacts are formed integrally with the conductor track, the segment of the first layer where the contacts are applied on is not covered by the second layer in order to allow electrical contacting of the contacts.

In the context of storing food items, a layer facing the object (innermost layer), for example the first layer, is made of a food grade material, i. e. a material that does not react with or degrades in contact with a food item which is stored in the bag. In a variant, the innermost layer, e. g. the first layer, is made of polyethylene or other polymers and may meet food safety regulations. In some embodiments with two or more layers, some or all of them may be made from such material, or the bag wall is made from a single layer of such material.

In an embodiment, one or more layers, in particular an outermost layer such as the second layer in a design with a first and second layer, can be printed on or be made of a material which is configured or suited to be printed on. In such embodiment, e.g. a food retailer may print his own labels and product details directly onto the bag wall. A further advantage of such embodiment is that the conductor track of a security bag with a wall having a printing thereon cannot be seen from the outside.

In an embodiment, the first and second polymer layer are designed as a multi-layer structure themselves. In this multi-layer structure several polymer layers of different materials can be used to combine different physical properties.

In an embodiment, the security bag includes at least one further conductor track that is embedded in the bag wall or alternatively arranged on the bag wall, wherein the at least one further conductor track is electrically unconnected to the conductor track.

Because of the basic design with a continuous conductor track, the conductor track must not intersect along its path. As a result, there are always small gaps left between neighboring segments respectively neighboring segments of the conductor track. Therefore, it might in principle be possible to cut along the gap between neighboring segments of the conductor track. To prevent a person from cutting in the area of the gap in order to create an opening that is sufficient to remove the object in an unauthorized manner, these gaps are in this embodiment filled by the further conductor track.

The further conductor track is electrically unconnected and is accordingly a fake conductor track respectively dummy conductor track. Its sole purpose is to deter from any attempt of unauthorized removal of the object and to make it harder to cut around the conductor track. A multitude of further conductor track segments can be arranged in an U-shaped manner, between the segments of the conductor track.

In an embodiment, the conductor track can additionally or alternatively have fake branches for a similar purpose. One end of a fake branch extends from the conductor track and/or either the electrical contacts, while the opposite other end of the fake branch is open respectively electrically unconnected.

In an embodiment, the security bag wall is made of a sheet. The sheet is bend along a folding line and welded together at edges adjacent to the folding line. During manufacture, the welding is generally performed after the bending. For manufacturing purposes, it is easier and therefore cheaper to apply the conductor track on a single respectively unfolded sheet. Furthermore, when bending over the sheet, it is also easier and therefore more cost efficient to meet the manufacturing tolerances. When being bent over, the parts of conductor track on both sides of the security bag favorably lie congruent.

In an embodiment, the surface segments are in each case substantially surrounded by the conductor track. As the security bag includes a continuous conductor track that defines one power circuit, the curves of the conductor track cannot intersect or overlap at any point. The object to be secured can typically be freely moved around within the security bag and turned around in all directions. Favorably, any curves respectively changes of direction of the conductor track have to be designed in a way such that the area that is substantially surrounded by the conductor track is not big enough to cut a hole which is big enough to remove the object, irrespectively of its position within the security bag, without interrupting the conductor track at least at one point and thereby triggering the alarm.

In an embodiment, the conductor track includes an edge conductor track, wherein the edge conductor track runs along at least one edge of the security bag. One shortcoming of a prior art security bag is that the edges are vulnerable against unauthorized removal of the object, as the conductor track does not cover these areas. The here-described edge conductor track is designed to run in parallel to the edge with a distance to the edge that is too small to cut a hole which would be big enough to remove an object. In this embodiment, the edge conductor track favourably runs along the folding line, as the edge along the folding line is not welded together and more vulnerable than the welded edges of the security bag.

In an aspect, the overall objective is achieved by a bag-object kit. The bag-object kit includes a security bag and an object within the security bag. With other words, the bag-object kit is the combination of an object and the respective security bag in which the object is stored. As described above, the object to be secured can typically be freely moved around within the security bag and turned around in all directions, in dependence of the dimensions of the object and the security bag. It is noted that the expression "object" also includes a number of structurally and distinct entities, such as a number of drill bits that are commonly stored in the security bag.

The security device includes a security bag or a bag-object kit. The security device further includes a security tag. The security tag includes a power source, a control circuit and an alarming device. The control circuit of the security tag is configured to monitor an electrical integrity of the conductor track and to trigger the alarming device if the electrical integrity of the conductor track is violated. The security tag further includes a counter connection interface and counter electrical contacts. The security tag is switchable between a locked state and alternative an unlocked state, such that in the locked state the security bag is interlocked to the security tag by the counter connection interface mating with the connection interface, and the counter electrical contacts electrically connect to the electrical contacts. In the unlocked state the security bag is unlocked with respect to the security tag, thereby enabling a separation of security bag and security tag.

In an embodiment, the security tag has a housing, comprising a first and second casing. The first casing is a base element. The second casing can in an embodiment be designed as a lid. The first and second casing can be connected movably together over a hinge.

Typically, the power source is realized by or includes a battery. The security tag further includes a control circuit. The control circuit is favorably configured to control a quiescent current through the conductor track, to detect a violation of the conductive path formed between the counter electrical contacts respectively by the conductor track. The control circuit can be configured to monitor the integrity of the conductor track by constantly measuring or monitoring the resistance between the counter electrical contacts. If the integrity of the conductor track is violated by cutting the conductor track, the resistance between the counter electrical contacts increases respectively the electric path between the counter electrical contacts is interrupted.

The security tag further includes an alarming device which is arranged in the first or second casing. The alarming device can be designed as, or include an acoustic signal generator, e.g. a buzzer and/or an applicable signal generator, e.g. a LED. The control circuit is configured to activate the alarming device if it detects an interruption of the conductive path formed between the counter electrical contacts respectively by the conductor track. Favourably, the control circuit is also configured to activate the alarming device when the tag is open in an unauthorized way, e.g. when the tag is broken by a thief.

The alarming device may be designed to generate a multi-stage alarm in terms of its intensity and/or duration. This can be used to set off a warning pre-alarm if the security device is even slightly moved. This may already be sufficient to deter the person performing the manipulations from continuing these manipulations without causing a general uproar.

In an embodiment, the counter connection interface is designed as at least one pin, connected to or being an integral part of the first or second casing. For this type of embodiment, the counter connection interface is configured to engage with the connection interface of the security bag, which may be designed as holes, thereby interlocking the security bag to the security tag in a positive form locking manner.

In an embodiment, the counter electrical contacts are designed as pins that may be plated for contacting reasons, e.g. with a gold plating. Depending on the design of the electrical contacts of the security bag, also alternative counter electrical contacts can be foreseen. In the locked state the circuit is closed and quiescent current flows from the power source to the first electrical contact and through the conductor track to the second electrical contact. Favorably the electrical contacts are designed as spring contacts.

In the unlocked state, the counter connection interface is configured to unlock the security bag from the security tag. In an embodiment, the first and second casing can be unfolded in the open state. Furthermore, in the locked state the counter electrical contacts are configured to disconnect from the electrical contacts. In an embodiment, the security device can include a hanger. The hanger is configured to store the security device to a store shelf.

In an embodiment, the security tag includes a core element and an extension element, which can be interconnected to the core element to extend the security tag in the counter connection interface direction. The counter connection interface direction is parallel to the main extension direction of the security tag. In the case of a very wide security bag, the security bag can be wider than the longest extension of the tag. The resulting overhang can be sufficient for an unauthorized removal of the object. Therefore, the tag can be extended in the counter connection interface direction. In this embodiment the extension element seals the overhang. In an embodiment the extension element is designed as two clip-ons. Favorably, these clip-ons are purely mechanical parts that do not include circuitry. The extension elements can be attached to the core element to enlarge the tag to manage wider security bags.

In an embodiment, the security devices includes a resonant oscillating circuit. The resonant oscillating circuit is configured to be detectable by an electronic article surveillance system. In a preferred embodiment, an alarm is generated by the alarm device, which is electrically coupled with the control circuit, when the resonant oscillating circuit is excited by an electronic article surveillance system.

In an embodiment the at least one security tag includes a movable locking arrangement and at least one thereto interconnectable counter locking arrangement. The movable locking arrangement is interlocked with the counter locking arrangement in the locked state and not interlocked with the counter locking element in the unlocked state. In an embodiment the movable locking arrangement may for example be designed as a slider that is placed in a respective slot in the second casing and placed in a slidable manner along a main extension direction of the first casing. The slider can include hook-like connector elements for interconnecting to the counter locking arrangement. The movable locking arrangement is interconnectable to at least one counter locking arrangement, wherein the movable locking arrangement is configured to be locked with the counter locking arrangement in the locked state. In an embodiment, the counter locking arrangement and the counter connection interface are designed integrally. The counter connection interface can be designed as pins which can be connected to or be an integral part of the first or second casing comprising a recess or bore for receiving the at least one hook-like connector element of the movable locking arrangement.

In an embodiment, the security tag further includes a switch in operative coupling with the control circuit. The switch can be located at either of the first casing or the second casing and is in the closed state actuated by the other of the first casing and the second casing. In the open state, the switch is not actuated anymore and thereby the alarming device is triggered via the control circuit, in particular if the security tag is in the activated state as explained further below.

In an embodiment the security device is switchable between an activated and an alternative deactivated state. The security device is configured in the activated state to trigger the alarming device when the electrical integrity is violated. In the deactivated state not to trigger the alarming device when the electrical integrity is violated. The security tag may be designed such that its activation is indicated by an optical signal, e.g. a blinking signal, of an optical indicator, e. g. an LED of security tag, and/or an acoustical control sound of the alarming device.

The deactivation of the alarming device occurs in the case of an authorized opening, preferably using a special magnetic opener or a key for this purpose. However, the security device may also be deactivated electronically by a remote control or by means of a deactivator plate. This is an additional safety mechanism, so that the alarming device would still be triggered if the securing device is opened with a special magnetic opener or key provided for this purpose, if the security device has not been deactivated electronically beforehand.

In an embodiment, the locking arrangement includes a magnetizable member, wherein the magnetizable member is configured to be moved by a magnetic opener. The opening of the locking arrangement is prevented by a magnetizable member provided in the first or second casing.

Upon movement of the movable locking arrangement into the locked state, a slender pin connected to the movable locking arrangement is introduced into a bore, where it is prevented from moving back by spring-loaded balls. Thus, upon closing the second casing, the first and the second casing are automatically locked together in the locked state. Herby also the power circuit is closed and the security device is thereby activated. To open the lock, the balls of the lock must be pulled away from the pin through the force of a magnet. The magnet is to be applied against the action of a spring acting on it, so that this pin is freed and can be withdrawn from the lock. Under the action of the spring, the second casing automatically springs open and the movable locking arrangement is moved into its unlocked position.

It is noted that above the security tag is described as part of a security device and in combination with a security bag. The right for further pursuing the security tag separately is reserved.

BRIEF DESCRIPTION OF THE DRAWINGS

FIG. 5 is a three-dimensional structure schematic view of an embodiment of the security tag;

FIG. 6 is a schematic sectional top view of the security tag pursuant to FIG. 5;

DETAILED DESCRIPTION OF THE INVENTION

Figure 1:
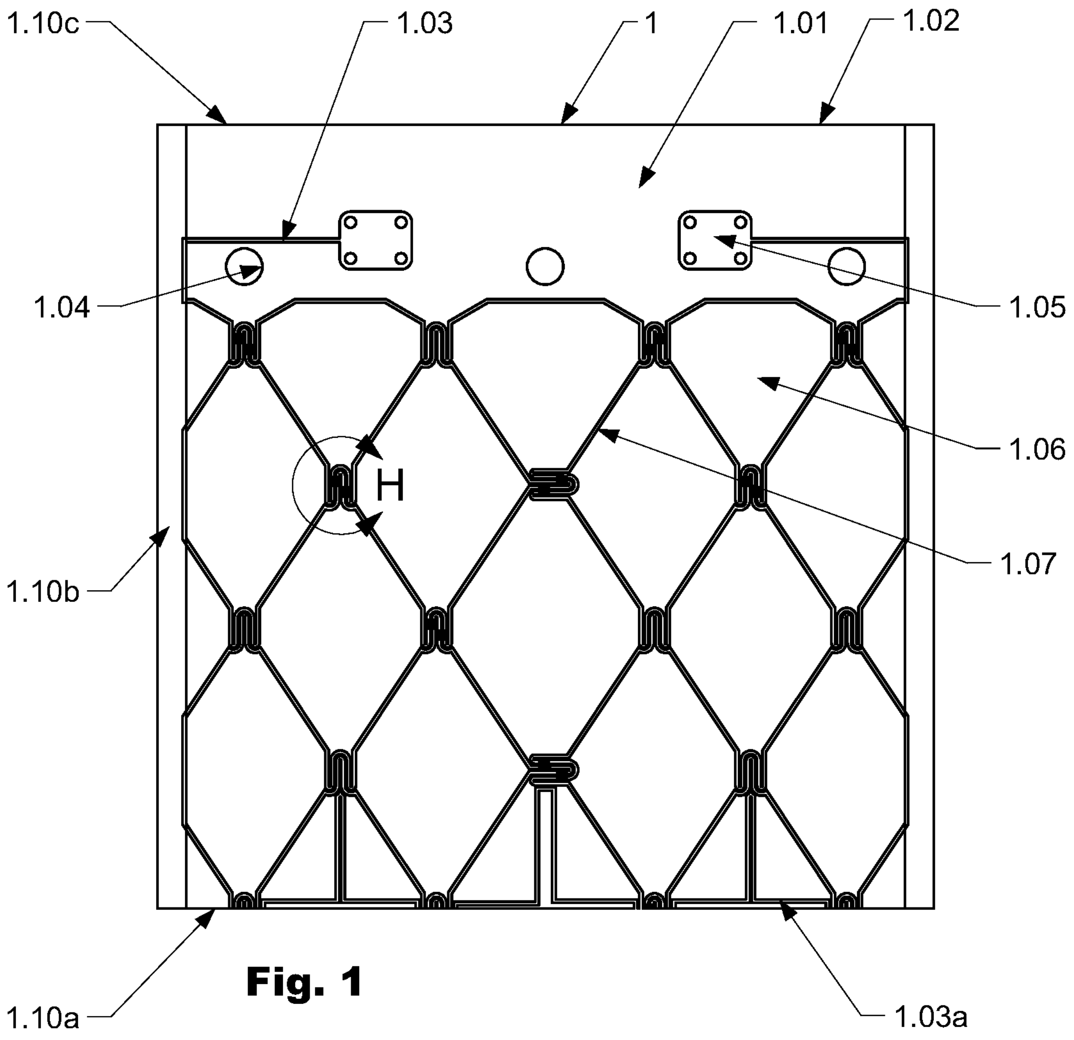
FIG. 1 is a schematic top view of an embodiment of a security bag.
Figure 2:
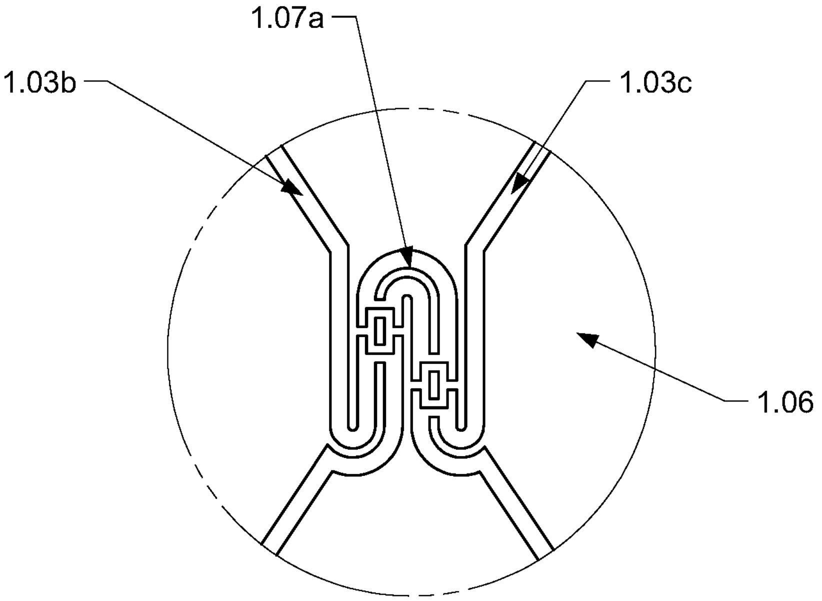
FIG. 2 is an enlarged top view of a portion of the security bag pursuant to FIG. 1.

FIGS. 1 and 2, show a top view of the security bag 1, showing a bag surface 1.01 of one of the bag walls 1.02 and the thereon applied conductor track 1.03. The security bag 1 has a connection interface which in the shown variant is designed as a number of round holes 1.04. Particularly in the shown embodiment, three holes are symmetrically distributed in proximity and parallel to the counter connection interface direction (z). The security bag 1 further includes two electrical contacts. The electrical contacts are arranged at opposite ends of the conductor track 1.03, such that the conductor track 1.03 extends between them. Exemplarily, the electrical contacts are formed integrally with the conductor track 1.03 and are designed in the form of rectangular patches 1.05. These rectangular patches 1.05 are seamlessly applied to the bag wall 1.02 together with the conductor track 1.03 in one process step. Surface segments 1.06 are the areas of the bag wall 1.02 that are circumferentially surrounded by the conductor track 1.03. The surface segments 1.06 are exemplarily rhomb shaped. Further, the surface segments 1.06 could also be arranged in an unsymmetrical pattern in dependence of the specific use scenario and the object 2 that shall be stored in the security bag 1.

To make it more difficult to open the security bag 1 in an unauthorized way without cutting the conductor track 1.03, the conductor track 1.03 includes sections that form an edge conductor track 1.03*a*. In the shown embodiment, the edge conductor track 1.03*a* partially runs in parallel and close proximity to the edge, thereby making it more difficult to open the security bag 1 along the edges without cutting the conductor track 1.03. The security bag 1 can include a further conductor track 1.07 which can be understood as "dummy track" to deter a potential violator.

The enlarged view of FIG. 2 shows a section where four surface segments 1.06 of the bag wall 1.02 meet. The enlarged view shows a first 1.03*b* and a second 1.03*c* segment of the conductor track 1.03. The coupling point is defined by a first 1.03*b* and second 1.03*c* segment of the conductor track 1.03 that partially run adjacent to each other, but by forming a gap between each other. The resulting gap can be bridged by the second conductor track. It would be possible to cut the bag wall 1.02 between the first 1.03*b* and second 1.03*c* segment of the conductor track 1.03. To make it more difficult to spot these gaps between the first 1.03*b* and second 1.03*c* segment of the conductor track 1.03, segments of the further conductor track 1.07*a* are arranged. Because of segments of the further conductor track 1.07*a*, the passages between the first 1.03*b* and second 1.03*c* segment of the conductor track 1.03 are more difficult to spot. The segment of the further conductor track 1.07 can be U-shaped. Therefore, it is virtually impossible to spot the gap under typical circumstances and in an environment that is typically given when attempting to steal an object 2 e. g. in a shop. In particular, any potential thief is under time pressure and can only rely on the naked eye.

Figure 3:
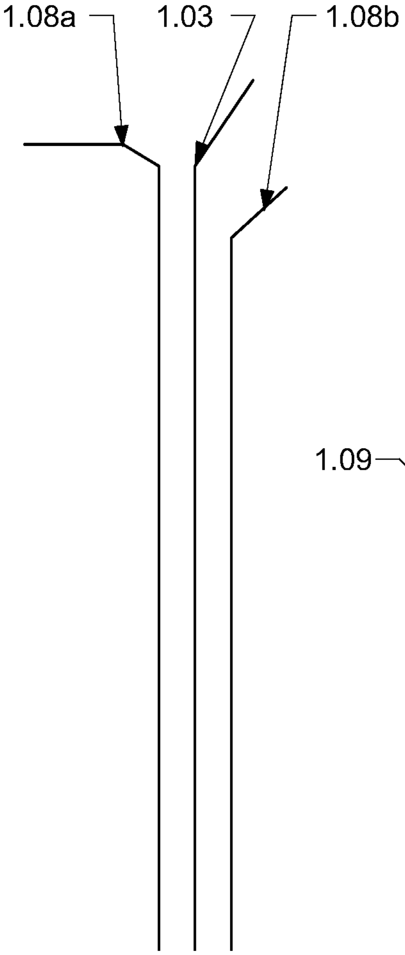
FIG. 3 is a schematic side view of the security bag pursuant to FIG. 1.

FIG. 3 shows a sandwich structure in an embodiment where the conductor track 1.03 is sandwiched between a first flexible polymer layer 1.08*a* and a second flexible polymer layer 1.08*b*.

Figure 4:
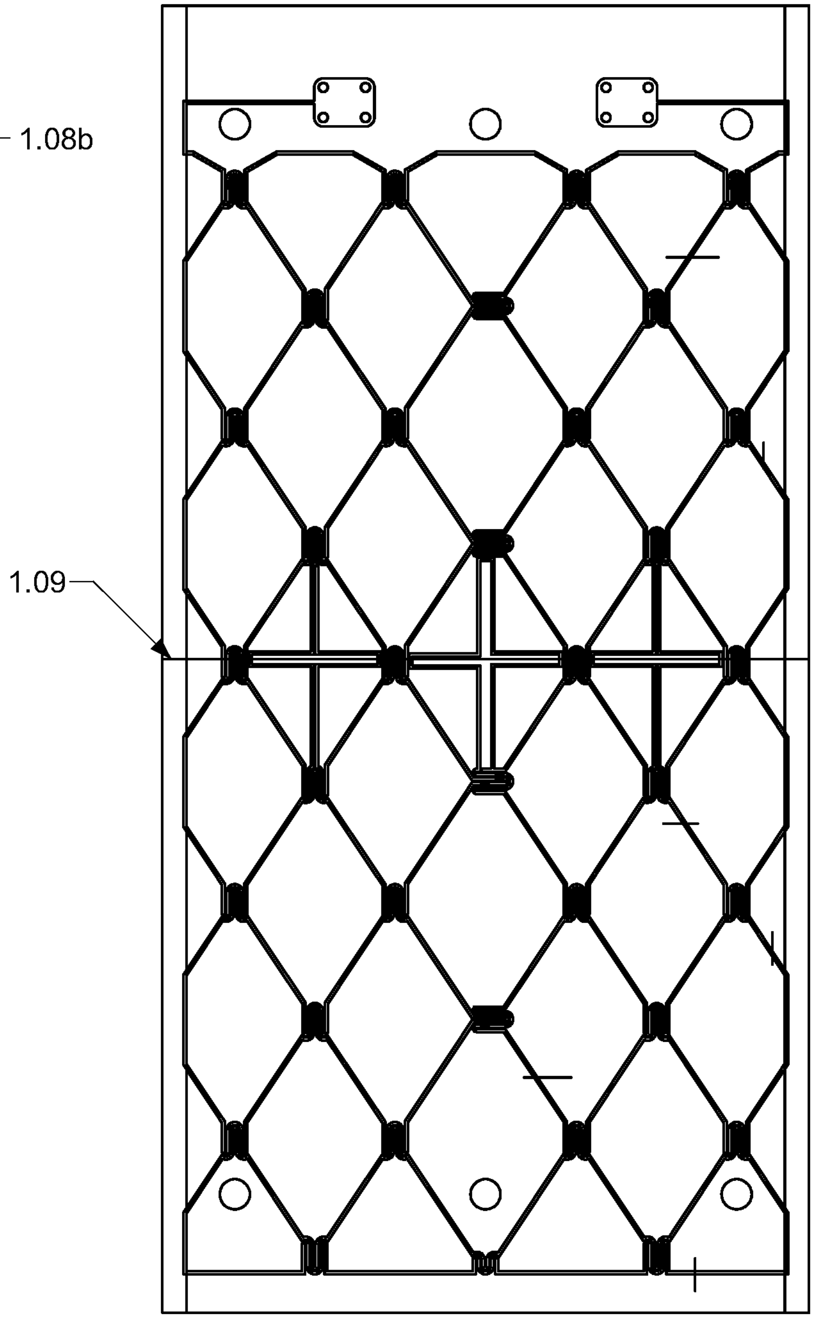
FIG. 4 is a schematic top view of an embodiment of the sheet.

FIG. 4 shows a semi-finished security bag 1 in form of a sheet. In the shown embodiment, the security bag 1 is produced by producing the whole bag surface 1.01 as one continuous sheet. After applying the conductor track 1.03 to the sheet, the sheet is bent along a folding line 1.09. To seal the security bag 1, the outer edges are welded together. The resulting security bag 1 has a folded edge 1.10*a*, and can have two welded edges 1.10*b* and one unsealed edge 1.10*c* forming an opening.

FIGS. 5 and 6 show an embodiment of a security tag 3. The shown security tag 3 includes, a power source 3.01, a control circuit 3.02 and an alarming device 3.11. The control circuit 3.02 is configured to activate the alarming device 3.11 when the integrity of the conductor track 1.03 is violated, in particular by cutting the conductor track or in the event of unauthorized removal of the security bag 1. In the shown embodiment, a counter connection interface mates with the connection interface of the security bag 1 and can be designed as cylindrical pins 3.03 that are either integral parts of a first 3.04*a* or second casing 3.04*b* of the tag 3 or fixed to either the first 3.04*a* or second 3.04*b* casing. The security tag 3 further includes counter electrical contacts that mate with the electrical contacts of the security bag 1. In the shown embodiment, the counter electrical contacts are designed as conductive cylindrical pins 3.05.

The security tag 3 further includes a locking arrangement. In the shown embodiment, the locking arrangement is designed as a slider 3.06 that can be placed in a respective slot in the first casing 3.04*a* and placed in a slidable manner along the longest extension of the first casing 3.04*a* wherein its extension can be parallel to the counter connection interface direction (z). The slider 3.06 can include a connector element for interconnecting to a counter connector element that is placed in the second casing 3.0*b*. The connector element can be shaped like a hook 3.07 and is configured to be locked with the counter locking arrangement in the locked state.

In an embodiment the at least one counter locking arrangement and the counter connection interface are integrally formed and designed as cylindrical pins 3.03 and preformed to the second casing 3.04*b*. The cylindrical pins 3.03 comprise a recess or bore for receiving the hook-like connector elements of the movable locking element. The shown magnetizable member is designed as a magnetizable pin 3.09 that can be locked with the locking arrangement in the closed position by interacting with a mating bore 3.10 in the locking arrangement. To open the security tag 3, the magnetizable member can only be retracted with a magnetic opener.

Figure 7:
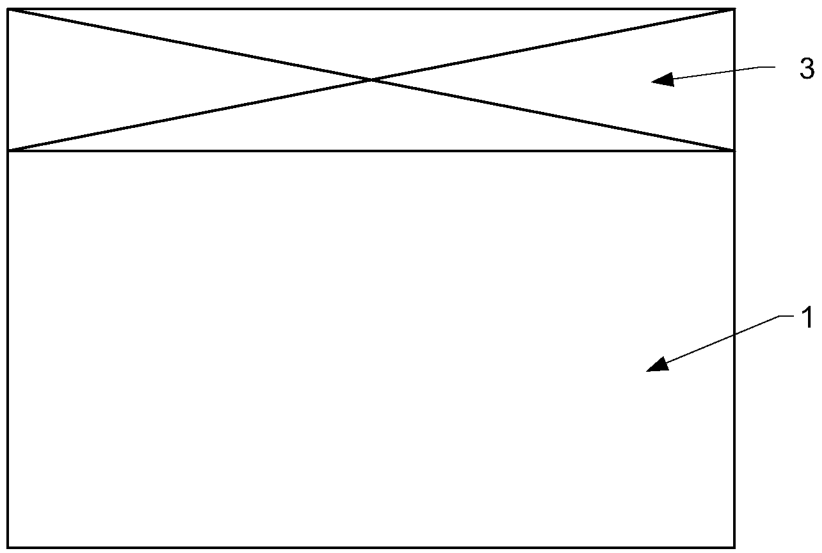
FIG. 7 is a schematic view of an embodiment of a security device.
Figure 8:
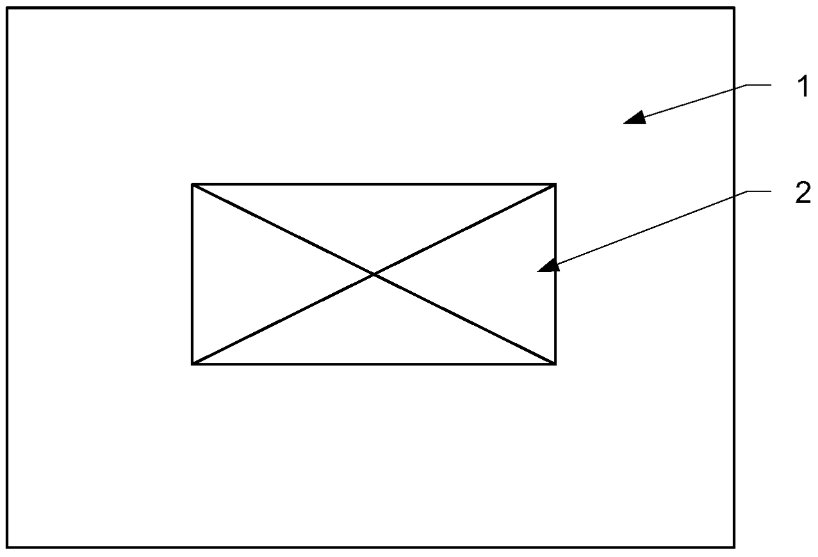
FIG. 8 is a schematic view of an embodiment of a bag object kit.

FIGS. 7 and 8 shown schematically a security device including a security bag 1 and a security tag 3. The security tag 3 can also be interconnected to a bag-object kit that is, a security bag 1 with an object 2 received therein. The shown bag object kit includes a security bag 1 and an object 2. As described above, the object 2 to be secured can be freely moved around within the security bag 1 and turned around in all directions. Therefore, the security bag 1 needs to be selected with regard to the smallest possible extension of the object 2 such that the largest extension of the bag surface 1.01 of the surface segments 1.06 is smaller than the minimal opening necessary to remove the object 2 without cutting the conductor track 1.03 to insert an opening in the bag wall 1.02.

Figure 9:
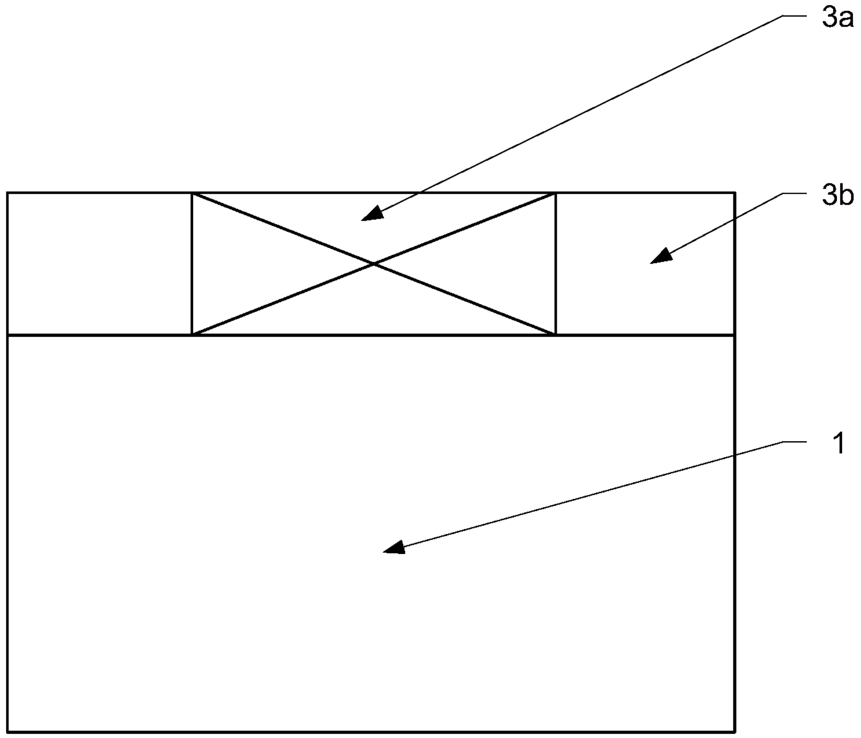
FIG. 9 is a schematic view of an embodiment of a tag with extension elements.

FIG. 9 shows an embodiment of the security device comprising at least one security tag 3 which includes a core element 3*a* and an extension element 3*b*, which can be interconnected to the core element 3*a* to extend the security tag 3 in the counter connection interface direction (z). In the case of a very wide security bag 1, the security bag 1 can be wider than the longest extension of the tag 3 in the counter connection interface direction (z). The resulting overhang can be sufficient for an unauthorized removal of the object 2. To prevent that, the security tag 3 can be extended in the extension counter connection interface direction (z). In this embodiment the extension element 3*b* seals the overhang of the security bag 1.

LIST OF DESIGNATIONS

| | |
|---|---|
| 1 | Security bag |
| 1.01 | Bag surface |
| 1.02 | Bag walls |
| 1.03 | Conductor track |
| 1.03a | Edge conductor track |
| 1.03b | First segment of the conductor track |
| 1.03c | Second segment of the conductor track |
| 1.04 | Round holes (connection interface) |
| 1.05 | rectangular patches (electrical contacts) |
| 1.06 | Surface segments |
| 1.07 | Further conductor track |
| 1.07a | a segment of the further conductor track |
| 1.08a | First polymer layer |
| 1.08b | Second polymer layer |
| 1.09 | Folding line |
| 1.10a | Folded edge |
| 1.10b | Welded edge |
| 1.10c | Unsealed edge |
| 2 | Object |
| 3 | Security tag |
| 3a | Core element |
| 3b | Extension element |
| 3.01 | Power source |
| 3.02 | control circuit |
| 3.03 | cylindrical pins (counter connection interface & counter locking arrangement) |
| 3.04a | A first casing |
| 3.04b | A second casing |
| 3.05 | Conductive cylindrical pins (counter electrical contacts) |
| 3.06 | Slider (movable locking arrangement) |
| 3.07 | Hook |
| 3.09 | Magnetizable pin (magnetizable member) |
| 3.10 | Bore |
| 3.11 | Alarming device |
| 3.12 | Resonant osciliating circuit |

The invention claimed is:

1. A security bag for storing an object, the security bag comprising:

a. a bag wall and a first conductor track embedded in or arranged on the bag wall, b. a connection interface configured to interlock the security bag to a security bag, and c. electrical contacts which are formed integrally with the first conductor track or are electrically connected to the first conductor track, wherein the electrical contacts are configured to electrically connect the first conductor track, d. wherein a path of the first conductor track defines a plurality of surface segments on the bag surface, wherein each surface segment is delimited in every direction on the bag surface by the first conductor track, and e. wherein at least one further conductor track is embedded in or arranged on the bag wall, wherein the at least one further conductor track is a fake conductor track which is electrically unconnected and arranged in a U-shaped manner between segments of the first conductor track, and/or wherein the first conductor track has fake branches, wherein one end of a fake branch extends from the first conductor track and/or one of the electrical contacts, while an opposite other end of the fake branch is open respectively electrically unconnected, thereby making areas between neighboring surface segments where the bag may be cut without violating the electrical integrity of the first conductor track more difficult to recognize.

2. The security bag according to claim 1, wherein the bag wall is made as a sandwich structure including a first and a second flexible polymer layer, wherein the first conductor track is at least partly sandwiched between the first and second flexible polymer layer.

3. The security bag according to claim 1, wherein the bag wall is made of a sheet which is bent along a folding line and welded together at edges adjacent to the folding line.

4. The security bag according to claim 1, wherein the surface segments are in each case substantially surrounded by the first conductor track.

5. The security bag according to claim 4, wherein the surface segments are rhomb-shaped.

6. The security bag according to claim 1, wherein the first conductor track includes an edge conductor track, wherein the edge conductor track runs along at least one edge of the security bag.

7. A bag-object kit, including the security bag according to claim 1, and an object within the security bag.

8. A security device, the security device including the security bag according to claim 1, the security device further including a security tag, wherein the security tag includes a. a power source, a control circuit and an alarming device, wherein the control circuit is configured to monitor an electrical integrity of the first conductor track and to trigger the alarming device if the electrical integrity of the first conductor track is violated, b. a counter connection interface, c. counter electrical contacts, wherein the security tag is switchable between a locked state and an alternative unlocked state, such that i. in the locked state the security bag is interlocked to the security tag by the counter connection interface mating with the connection interface, and the counter electrical contacts electrically connect to the electrical contacts, and ii. in the unlocked state the security bag is unlocked with respect to the security tag, thereby enabling a separation of security bag and security tag.

9. The security device according to claim 8, wherein the security tag includes a core element and an extension element which can be interconnected to the core element to extend the security tag in a counter connection interface direction.

10. The security device according to claim 8, wherein the security device includes a resonant oscillating circuit configured to be detectable by an electronic article surveillance system.

11. The security device according to claim 8, wherein the security tag includes a movable locking arrangement and at least one thereto interconnectable counter locking arrangement, wherein the movable locking arrangement is interlocked with the counter locking arrangement in the locked state and not interlocked with the counter locking arrangement in the unlocked state.

12. The security device according to claim 11, wherein the locking arrangement includes a magnetizable member, wherein the magnetizable member is configured to be moved by a magnetic opener.

13. The security device according to claim 8, wherein the security device is switchable between an activated and an alternative deactivated state, wherein the security device is configured i. in the activated state to trigger the alarming device when the electrical integrity is violated, ii. in the deactivated state not to trigger the alarming device when the electrical integrity is violated.

14. A method for storing an object, the method including storing the object in a security bag according to claim 1.

* * * * *